United States Patent
Vickers, Jr. et al.

(10) Patent No.: US 6,310,143 B1
(45) Date of Patent: Oct. 30, 2001

(54) DERIVATIZED POLYCARBOXYLATE DISPERSANTS

(75) Inventors: Thomas M. Vickers, Jr., Concord Township; Rainer Packe-Wirth, Cleveland Heights; Jeffrey R. Bury, Macedonia; Jesse Osborne, Garfield Heights; Runhai Lu, Stow; John Moreau, Macedonia; Lynn E. Brower, Solon; Samy M. Shendy, Cuyahoga Falls; John Pickett, Bedford, all of OH (US)

(73) Assignee: MBT Holding AG, Zurich (CH)

( * ) Notice: Subject to any disclaimer, the term of this patent is extended or adjusted under 35 U.S.C. 154(b) by 0 days.

(21) Appl. No.: 09/212,652

(22) Filed: Dec. 16, 1998

(51) Int. Cl.$^7$ ............................. B01F 17/34; C04B 40/00; C08F 8/30
(52) U.S. Cl. .................. 525/327.6; 106/823; 264/71; 524/10; 516/93; 516/912; 516/915; 525/919; 526/262; 526/317.1; 526/932
(58) Field of Search ........................... 516/93, 912, 915; 106/823; 526/262, 317.1, 932; 525/919, 327.6

(56) References Cited

U.S. PATENT DOCUMENTS

| | | | |
|---|---|---|---|
| Re. 35,194 | 4/1996 | Gerber | 106/696 |
| 2,790,724 | 4/1957 | Bergman | 106/90 |
| 3,520,852 | * 7/1970 | Pratt et al. | 525/327.6 X |
| 3,840,499 | * 10/1974 | DiGiulio | 526/262 X |
| 4,090,946 | 5/1978 | Nottes et al. | 208/48 AA |

(List continued on next page.)

FOREIGN PATENT DOCUMENTS

| | | | |
|---|---|---|---|
| 537870 A | 4/1993 | (EP) . | |
| 725044 A | 8/1996 | (EP) . | |
| 753488 A1 | 1/1997 | (EP) . | |
| 838444 A2 | 4/1998 | (EP) . | |
| 850894 A1 | 7/1998 | (EP) . | |
| 0930321 A1 | 7/1999 | (EP) . | |
| 2121807 | * 1/1984 | (GB) | 525/327.6 |
| 63285142 A | 11/1988 | (JP) . | |
| 1188449 A | 7/1989 | (JP) . | |
| 2281014 A | 11/1990 | (JP) . | |
| 3218956 A | 9/1991 | (JP) . | |
| 4119955 A | 4/1992 | (JP) . | |
| 4119956 A | 4/1992 | (JP) . | |
| 4175253 A | 6/1992 | (JP) . | |
| 4175254 A | 6/1992 | (JP) . | |
| 5170501 A | 7/1993 | (JP) . | |
| 5246743 A | 9/1993 | (JP) . | |
| 6064956 A | 3/1994 | (JP) . | |
| 6107446 A | 4/1994 | (JP) . | |
| 6157100 A | 6/1994 | (JP) . | |
| 6183803 A | 7/1994 | (JP) . | |
| 6256054 A | 9/1994 | (JP) . | |
| 6279082 A | 10/1994 | (JP) . | |
| 6298557 A | 10/1994 | (JP) . | |
| 6321596 A | 11/1994 | (JP) . | |
| 7025650 A | 1/1995 | (JP) . | |
| 7025651 A | 1/1995 | (JP) . | |
| 7053249 A | 5/1995 | (JP) . | |
| 7126053 A | 5/1995 | (JP) . | |
| 7247148 A | 9/1995 | (JP) . | |
| 7247149 A | 9/1995 | (JP) . | |
| 7247150 A | 9/1995 | (JP) . | |
| 8012398 A | 1/1996 | (JP) . | |
| 8012401 A | 1/1996 | (JP) . | |
| 8034652 A | 2/1996 | (JP) . | |
| 8048852 A | 2/1996 | (JP) . | |
| 8059323 A | 3/1996 | (JP) . | |
| 8119701 A | 5/1996 | (JP) . | |
| 8165156 A | 6/1996 | (JP) . | |
| 8268741 A | 10/1996 | (JP) . | |
| 8295547 A | 11/1996 | (JP) . | |

(List continued on next page.)

OTHER PUBLICATIONS

Patent Abstract of Japan, Publication No. 07267705, Applicant: Fujisawa Pharmaceut Co. Ltd., Publication Date: Oct. 17, 1995.

*Primary Examiner*—Richard D. Lovering
(74) *Attorney, Agent, or Firm*—Renner, Kenner, Grieve, Bobak, Taylor & Weber

(57) ABSTRACT

The present invention is directed to derivatized polycarboxylate dispersants for cementitious mixtures, including those mixtures with high percentages of pozzolan cement replacement and dry cast applications. In particular, the invention is directed to a cementitious mixture comprising cement, including cements with high percentages of pozzolan cement replacement, water, coarse aggregate, fine aggregate, and including a dispersant, wherein said dispersant is a derivatized polycarboxylate dispersant, or combination of polycarboxylate dispersants, which is a derivatized polymer comprising a backbone having moieties derived from (a) an unsaturated hydrocarbon; (b) at least one of a substituted carboxylic acid monomer, a substituted ethylenically unsaturated monomer, and maleic anhydride; and (c) optionally including an N-polyoxyalkylene succinimide; and wherein derivative moieties are pendant to the backbone monomer by at least one ester linkage and at least one amide linkage. The derivatized polycarboxylate dispersant provides for a longer shelf life dispersant, improved dispersability of cementitious mixtures, water reduction in cementitious mixtures, and is an effective dispersant in high pozzolan replaced cementitious mixtures.

12 Claims, No Drawings

U.S. PATENT DOCUMENTS

| | | | |
|---|---|---|---|
| 4,460,720 | 7/1984 | Gaidis et al. | 524/5 |
| 4,471,100 | 9/1984 | Tsubakimoto et al. | 525/367 |
| 4,581,147 | 4/1986 | Branch, III . | |
| 4,650,522 | 3/1987 | Teraji et al. | 106/314 |
| 4,655,942 | 4/1987 | Dickert, Jr. et al. . | |
| 4,681,634 | 7/1987 | Roca et al. | 706/90 |
| 4,703,087 | 10/1987 | Lange et al. | 525/161 |
| 4,777,208 | 10/1988 | Hefner, Jr. et al. | 524/855 |
| 4,792,343 | 12/1988 | Hawe et al. . | |
| 4,797,450 | 1/1989 | Dehm et al. | 525/326.7 |
| 4,808,641 | 2/1989 | Yagi et al. | 524/5 |
| 4,968,734 | 11/1990 | Gaidis et al. | 524/5 |
| 4,972,025 | 11/1990 | Tsubakimoto et al. | 525/329.4 |
| 5,100,984 | 3/1992 | Burge et al. | 526/240 |
| 5,134,187 | 7/1992 | Aihara | 524/548 |
| 5,158,996 | 10/1992 | Valenti | 524/5 |
| 5,219,664 * | 6/1993 | Faust et al. | 526/317.1 X |
| 5,223,036 | 6/1993 | Koyata et al. | 106/274 |
| 5,348,993 | 9/1994 | Daeumer et al. | 524/44 |
| 5,349,036 * | 9/1994 | Simpson et al. | 526/317.1 X |
| 5,358,566 | 10/1994 | Tanaka et al. | 106/823 |
| 5,369,198 | 11/1994 | Albrecht et al. | 526/240 |
| 5,393,343 | 2/1995 | Darwin et al. | 106/808 |
| 5,424,445 | 6/1995 | Hendrick ter Maat et al. | 548/543 |
| 5,565,537 * | 10/1996 | Uda et al. | 526/317.1 X |
| 5,576,378 | 11/1996 | Kuhlmann et al. | 524/523 |
| 5,583,183 | 12/1996 | Darwin et al. | 525/329.4 |
| 5,604,273 | 2/1997 | Kerkar et al. | 524/4 |
| 5,609,681 | 3/1997 | Drs et al. | 106/802 |
| 5,612,396 | 3/1997 | Valenti et al. | 524/5 |
| 5,614,017 | 3/1997 | Shawl | 106/823 |
| 5,633,298 | 5/1997 | Arfaei et al. | 524/5 |
| 5,633,310 | 5/1997 | Sulser et al. | 524/555 |
| 5,643,978 | 7/1997 | Darwin et al. | 524/5 |
| 5,661,206 | 8/1997 | Tanaka et al. | 524/378 |
| 5,665,158 | 9/1997 | Darwin et al. | 106/808 |
| 5,665,842 | 9/1997 | Leikauf | 526/279 |
| 5,668,195 | 9/1997 | Leikauf | 524/5 |
| 5,670,578 | 9/1997 | Shawl | 525/187 |
| 5,674,316 | 10/1997 | Izumi et al. | 106/724 |
| 5,703,174 | 12/1997 | Arfaei et al. | 525/329.9 |
| 5,707,445 | 1/1998 | Yamato et al. | 106/802 |
| 5,725,657 | 3/1998 | Darwin et al. | 106/808 |
| 5,726,267 | 3/1998 | Howland et al. | 526/304 |
| 5,728,207 | 3/1998 | Arfaei et al. | 106/709 |
| 5,739,212 | 4/1998 | Wutz et al. | 525/411 |
| 5,753,744 | 5/1998 | Darwin et al. | 524/549 |
| 5,786,436 | 7/1998 | Fischer et al. | 526/307.6 |
| 5,798,425 | 8/1998 | Albrecht et al. | 521/271 |
| 5,840,114 | 11/1998 | Jeknavorian et al. | 106/802 |
| 5,856,418 | 1/1999 | Maeda et al. | 526/304 |
| 5,912,284 | 6/1999 | Hirata et al. | 524/5 |
| 5,925,184 | 7/1999 | Hirata et al. | 106/696 |
| 6,136,950 * | 10/2000 | Vickers, Jr. et al. | 106/823 X |

FOREIGN PATENT DOCUMENTS

| | | |
|---|---|---|
| 9012351 A | 1/1997 | (JP) . |
| 9067153 A | 3/1997 | (JP) . |
| 9110492 A | 4/1997 | (JP) . |
| 9132445 A | 5/1997 | (JP) . |
| 9132446 A | 5/1997 | (JP) . |
| 9142905 A | 6/1997 | (JP) . |
| 9142906 A | 6/1997 | (JP) . |
| 9241055 A | 9/1997 | (JP) . |
| 9278505 A | 10/1997 | (JP) . |
| WO97/08217 A1 | 3/1997 | (WO) . |
| WO97/39037 | 10/1997 | (WO) . |
| WO98/51640 | 11/1998 | (WO) . |

* cited by examiner

DERIVATIZED POLYCARBOXYLATE DISPERSANTS

FIELD OF THE INVENTION

The present invention is directed to dispersants for cementitious compositions. More particularly, the present invention is directed to a derivatized polycarboxylate dispersant for dispersing cementitious mixtures with improved solution performance stability.

BACKGROUND OF THE INVENTION

Dispersants have been used in the construction industry to disperse cementitious mixtures. Dispersants such as sulfonated melamine formaldehyde condensate (SMF) and sulfonated naphthalene formaldehyde condensate (BNS) are commonly used as dispersants. However, these compounds require more than the desired amount of material to achieve a desired level of concrete workability or water reduction. In addition, these materials do not achieve full range (Type A to Type F) water reducing capability, as defined in ASTM C494.

It is important that dispersants be used in concrete situations where strength and durability are involved. Dispersants are a necessary component in high strength and high durability concretes. Due to the use of low water amounts in the high performance concretes, sometimes high dispersant amounts are necessary to achieve workable concretes. High BNS levels can lead to undesirable retardation of set and may not provide the required workability retention over time.

It is desirable to provide a material that is several times more efficient as a cement or concrete dispersant than the traditional materials like BNS and SMF. Improving efficiency reduces the amount of material required to achieve a desired level of concrete workability or water reduction. With respect to the presently used dispersants, BNS and SMF, it is also desirable to improve slump retention while maintaining normal setting characteristics. Providing a dispersant with full range (Type A to F) water reducing capability is also a desirable characteristic.

A cementitious mixture refers to pastes, mortars, and concrete compositions comprising a hydraulic cement binder. Cementitious mixtures may also include high percentages of pozzolan cement replacement. Pastes are defined as mixtures composed of a hydraulic cement binder, either alone or in combination with pozzolans such as fly ash, silica fume, or blast furnace slag, and water. Mortars are defined as pastes that additionally include fine aggregate. Concretes additionally include coarse aggregate. These compositions may additionally include other admixtures such as set retarders, set accelerators, defoaming agents, air-entraining or air detraining agents, corrosion inhibitors, water reducing agents, pigments, and any other admixture that does not adversely affect the advantageous results obtained by the admixtures of the present invention.

Certain prior art polymer dispersants have inadequate long term solution stability. As time progresses, these prior art polymers become less effective as a dispersant.

Over the years, the use of pozzolanic materials as a partial replacement for portland cement in concrete has become an increasingly attractive alternative to portland cement alone. The desire to increase the use of fly ash, blast furnace slag, and natural pozzolanic cement in concrete mixtures can be attributed to several factors. These include cement shortages, economic advantages of portland cement replacement, improvements in permeability of the concrete product, and lower heats of hydration.

The growth in the use of higher amounts of pozzolanic cement replacements, such as fly ash for example, in concrete has been impaired by the potential incompatibility exhibited by these materials, especially when used at high percentages, in combination with water reducing admixtures. Water reducers are desirable to decrease the amount of water required in the preparation of the cementitious mixtures, and to increase the strength of the resulting concrete. However, the incompatibility of the pozzolan replacement materials with certain water reducing admixtures can result in the significant retardation of the initial and final setting of the concrete containing both these materials.

Despite the cost and performance advantages of fly ash, slag, and natural pozzolans as partial replacements of portland cement in concrete, there are practical limitations to the amount at which they can be used in the cementitious mixture. Using these materials at higher levels, such as above about 10 to 15 weight percent based on the weight of the portland cement, can result in the retarded setting time of the concrete up to several hours, and perhaps longer depending upon the ambient temperature. This incompatibility puts a burden of increased costs and time on the end user which is unacceptable.

While it is known to use set time accelerators in concrete mixtures, these accelerator admixtures have been ineffective in solving the compatibility problem that exists in high pozzolan replacement/portland cement mixtures, particularly when used with water reducing admixtures, so that set time is not able to be decreased to an acceptable level. The use of accelerators with water reducers, such as naphthalene sulfonate formaldehyde condensates, lignin and substituted lignins, sulfonated melamine formaldehyde condensates and the like, has been ineffective to produce an acceptable high pozzolanic replacement containing hydraulic cement based cementitious mixture with normal setting characteristics and an acceptable resulting concrete.

U.S. Pat. Nos. 4,373,956 and 4,473,405 discloses various admixture compositions for incorporation into hydraulic cement mixes to accelerate the rate of hardening and setting. U.S. Pat. No. 4,337,094 discloses combinations of additives which can be used to accelerate the setting time of portland type cements. These additives, when used in cementitious mixtures containing portland cement and high proportions of pozzolan cement replacements, as well as a water reducer, cannot compensate for the retardation of setting time induced in the mixtures by the cement replacement and water reducer, and thus do not acceptably accelerate the mixture to setting.

U.S. Pat. No. 5,556,458 discloses a cementitious composition containing a high percentage of fly ash and hydraulic cement, but in which a fly ash containing a particular calcium oxide content is required and a water reducing admixture is not present. The composition is useful for quick setting repair mortar type products.

A cementitious dry cast mixture refers to pastes, mortars, and concrete compositions comprising a hydraulic cement binder having consistencies ranging from stiff to extremely dry as defined in ACI 211.3R, Table 2.3.1.

Cementitious dry cast mixtures are used to form many articles, for example, concrete pipe, roof tile, masonry units, paver units, extruded plank, and any other preformed cementitious articles, in a mold or from an extrusion die. Each of these applications has basic desired characteristics that are critical in terms of producing quality finished units.

In masonry block applications, production speed, sufficient green strength, and the ability to resist slumping, sagging or deforming when stripped from the mold is critical since stripping occurs immediately after casting. The same is true for concrete pipe or roof tile with the additional desired property of improved surface appearance with reduced surface imperfections and reduced roller and/or die wear on equipment producing extruded pieces.

It is desired to reduce the cycle time of the manufacture of each article. The reduction of cycle time reduces the cost of manufacture for each article and increases the number of articles that can be produced in a given time. Cycle time is defined as the time to complete one full cycle from the beginning of feed to the beginning of feed. The beginning of feed is when the dry cast mixture is fed from a collection hopper into the process. It is also desired to improve the compaction and consolidation of the cementitious dry cast mixture without altering the consistency of the mixture.

Green strength refers to the stability of the article in retaining its shape once the article is removed from the mold or extruder. Green strength is dependent on the consistency of the cementitious dry cast mixture, the amount of fines in the cementitious dry cast mixture, and the moldability of the cementitious dry cast mixture.

Currently, the water to cement (W/C) ratio used in present dry cast mixtures is from about 0.25 to about 0.40. It is desired to minimize the amount of water needed in a cementitious dry cast mixture to achieve consolidation and no sag or deformation in an article produced from the cementitious dry cast mixture.

Another limiting factor in the improvement of dry cast mixtures is the type and amount of dispersant used. Conventional dispersant chemistries such as naphthalene sulfonates, melamine sulfonates, and lignosulfonates have a lower limit to their effective dosage; below which they are not effective. At levels above the effective dosage of these dispersants, the dry cast mixture becomes critically sensitive to very slight changes in water or moisture content. This makes the use of these dispersants impractical.

A further limitation in the present art is the compressive strength of articles produced from cementitious dry cast mixtures. Compressive strength is directly related to the density of the article.

What is required by the industry, however, is a cementitious mixture capable of forming concrete with a dispersant that is more effective than SMF or BNS condensates at lower effective dosages and which provides Type A to Type F water-reducing effect. Also required by the industry is a cementitious mixture capable of forming concrete which contains a significant percentage of cement replacement material (to replace a portion of the hydraulic cement, such as portland cement) for performance and cost considerations, and water reducers to decrease water usage and increase compressive strength and durability, the components in such cementitious mixtures being compatible and which mixtures set in an industry-acceptable time period. Also required by the industry is a cementitious dry cast mixture containing a dispersant that has a low effective dosage, that is not critically sensitive to changes in water or moisture content, that functions in mixtures having a slump of less than about one (1) inch, that permits mixture consolidation and compaction in response to vibration energy, that has increased green strength and compressive strength, and that provides for reduced cycle time in the manufacture of articles from dry cast mixtures.

It is therefore an object of the invention to provide a cement or concrete dispersant that has increased solution storage life.

It is another object of the present invention to provide a cement or concrete dispersant material that is several times more efficient than the traditional dispersants such as BNS and SMF condensates.

It is another object of the present invention to provide a cement or concrete dispersant material with improved efficiency which reduces the amount of material required to achieve a desired level of concrete workability or water reduction.

It is another object of the present invention to provide a cement or concrete dispersant material to improve concrete slump retention while maintaining normal setting characteristics.

It is another object of the present invention to provide a cement or concrete dispersant material capable of providing a Type A to Type F water-reducing effect.

It is another object of the invention to provide a cementitious mixture which contains a significant proportion of pozzolan cement replacement materials for hydraulic cement, such as portland cement, as well as water reducing materials, which have acceptable or improved compressive strength.

It is another object of the invention to provide a cementitious mixture which contains a significant proportion of pozzolan cement replacement materials for hydraulic cement, such as portland cement, as well as water reducing materials, which set in an industry-acceptable time period.

It is another object of the invention to provide a method for preparing a cementitious material which contains a significant proportion of pozzolan cement replacement materials for hydraulic cement, such as portland cement, as well as water reducing materials, which have acceptable or improved compressive strength and which set in an industry-acceptable time period.

It is another object of the invention to provide a compatibilizing admixture for cementitious mixtures which contain a significant proportion of pozzolan cement replacement materials for hydraulic cement, such as portland cement, which admixtures provide water reducing means for imparting acceptable or improved compressive strength, and set accelerating means for inducing the mixture to set in an industry-acceptable time period.

It is another object of the invention to provide a cementitious dry cast mixture that consolidates and compacts in response to vibration energy.

It is another object of the invention to reduce the cycle time of manufacturing a cementitious dry cast mixture article to reduce the cost of manufacture of the article.

It is another object of the invention to provide a cementitious dry cast mixture article that has increased green strength and increased compressive strength.

It is another object of the invention to provide a cementitious dry cast mixture article that has increased density.

It is another object of the invention to provide a cementitious dry cast mixture that has improved surface appearance because the increased density and compaction reduces the air pockets and imperfections that form as a result of poor consolidation.

It is another object of the invention to provide sufficient dispersion of uncompacted silica fume or partially compacted silica fume in the cementitious dry cast mixture without altering the consistency of the mixture and without increasing the required water content of the mixture.

SUMMARY OF THE INVENTION

The present invention is directed to derivatized polycarboxylate dispersants for cementitious mixtures. In particular, the invention is directed to a cementitious mixture comprising cement, water, coarse aggregate, fine aggregate, and including a dispersant, wherein said dispersant is a derivatized polycarboxylate dispersant, or combination of polycarboxylate dispersants, which is a derivatized polymer comprising a backbone having moieties derived from (a) an unsaturated hydrocarbon; (b) at least one of a substituted carboxylic acid monomer, a substituted ethylenically unsaturated monomer, and maleic anhydride; and (c) optionally including an N-polyoxyalkylene succinimide; and wherein derivative moieties are pendant to the backbone monomer by at least one ester linkage and at least one amide linkage. The derivatized polycarboxylate dispersant is a random copolymer of the general structural units shown below:

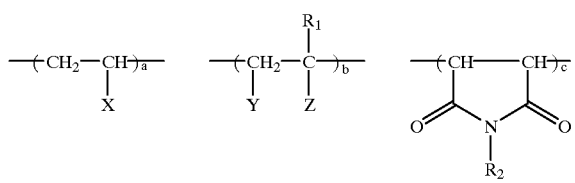

wherein:
the "b" structure is one of a substituted carboxylic acid monomer, a substituted ethylenically unsaturated monomer, and maleic anhydride wherein an acid anhydride group (—CO—O—CO—) is formed in place of the groups Y and Z between the carbon atoms to which the groups Y and Z are bonded respectively, and the "b" structure must include at least one moiety with a pendant ester linkage and at least one moiety with a pendant amide linkage;

X=H, $CH_3$, $C_2$ to $C_6$ Alkyl, Phenyl, or Substituted Phenyl such as p-Methyl Phenyl, p-Ethyl Phenyl, Carboxylated Phenyl, Sulfonated Phenyl and the like;

Y=H, —COOM, —COOH, or W;

W=a hydrophobic defoamer represented by the formula $R_5$—$(CH_2CH_2O)_s$—$(CH_2C(CH_3)HO)_t$—$(CH_2CH_2O)_u$ where s, t, and u are integers from 0 to 200 with the proviso that t>(s+u) and wherein the total amount of hydrophobic defoamer is present in an amount less than about 10% by weight of the derivatized polycarboxylate dispersant;

Z=H, —COOM, —$OR_3$, —$COOR_3$, —$CH_2OR_3$, or —$CONHR_3$;

$R_1$=H, or $CH_3$;

$R_2$, $R_3$, are each independently a random copolymer of oxyethylene units and oxypropylene units of the general formula —$(CH_2C(R_1)HO)_mR_4$ where m=10 to 500 and wherein the amount of oxyethylene in the random copolymer is from about 60% to 100% and the amount of oxypropylene in the random copolymer is from 0% to about 40%;

$R_4$=H, Methyl, or $C_2$ to $C_8$ Alkyl;

$R_5$=$C_1$ to $C_{18}$ alkyl or $C_6$ to $C_{18}$ alkyl aryl;

M=Alkali Metal, Alkaline Earth Metal, Ammonia, Amine, Substituted Amine such as monoethanol amine, diethanol amine, triethanol amine, morpholine, imidazole and the like;

a=0.01–0.8, preferably 0.01–0.6, and most preferably 0.01–0.5;

b=0.2–0.99, preferably 0.3–0.99, and most preferably 0.4–0.99;

c=0–0.5, preferably 0–0.3, and most preferably 0–0.1; and wherein a, b, c represent the mole fraction of each unit and the sum of a, b, and C, is 1.

Preferably, the "a" structure includes a styrene moiety.

Additionally, the derivatized polycarboxylate dispersant of the present invention is formulated into a compatibilizing admixture for cementitious mixtures containing hydraulic portland cement and greater than about 10 percent pozzolanic cement replacement by weight of the portland cement and cement replacement.

Additionally, the derivatized polycarboxylate dispersant of the present invention is formulated into cementitious dry cast mixtures for forming cementitious articles. The cementitious dry cast mixture comprises cement, water, coarse aggregate, fine aggregate, and the derivatized polycarboxylate dispersant of the present invention.

DETAILED DESCRIPTION OF THE INVENTION

The present invention is directed to derivatized polycarboxylate dispersants for cementitious mixtures. In particular, the invention is directed to a cementitious mixture comprising cement, water, coarse aggregate, fine aggregate, and including a dispersant, wherein said dispersant is a derivatized polycarboxylate dispersant, or combination of polycarboxylate dispersants, which is a derivatized polymer comprising a backbone having moieties derived from (a) an unsaturated hydrocarbon; (b) at least one of a substituted carboxylic acid monomer, a substituted ethylenically unsaturated monomer, and maleic anhydride; and (c) optionally including an N-polyoxyalkylene succinimide; and wherein derivative moieties are pendant to the backbone monomer by at least one ester linkage and at least one amide linkage. The derivatized polycarboxylate dispersant is a random copolymer of the general structural units shown below:

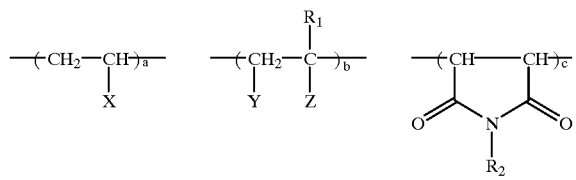

wherein:
the "b" structure is one of a substituted carboxylic acid monomer, a substituted ethylenically unsaturated monomer, and maleic anhydride wherein an acid anhydride group (—CO—O—CO—) is formed in place of the groups Y and Z between the carbon atoms to which the groups Y and Z are bonded respectively, and the "b" structure must include at least one moiety with a pendant ester linkage and at least one moiety with a pendant amide linkage;

X=H, $CH_3$, $C_2$ to $C_6$ Alkyl, Phenyl, or Substituted Phenyl such as p-Methyl Phenyl, p-Ethyl Phenyl, Carboxylated Phenyl, Sulfonated Phenyl and the like;

Y=H, —COOM, —COOH, or W;

W=a hydrophobic defoamer represented by the formula $R_5$—$(CH_2CH_2O)_s$—$(CH_2C(CH_3)HO)_t$—$(CH_2CH_2O)_u$ where s, t, and u are integers from 0 to 200 with the proviso that t>(s+u) and wherein the total amount of hydrophobic defoamer is present in an amount less than about 10% by weight of the derivatized polycarboxylate dispersant;

Z=H, —COOM, —$OR_3$, —$COOR_3$, —$CH_2OR_3$, or —$CONHR_3$;

$R_1$=H, or $CH_3$;

$R_2$, $R_3$, are each independently a random copolymer of oxyethylene units and oxypropylene units of the general formula —$(CH_2C(R_1)HO)_m R_4$ where m=10 to 500 and wherein the amount of oxyethylene in the random copolymer is from about 60% to 100% and the amount of oxypropylene in the random copolymer is from 0% to about 40%;

$R_4$=H, Methyl, or $C_2$ to $C_8$ Alkyl;

$R_5$=$C_1$ to $C_{18}$ alkyl or $C_6$ to $C_{18}$ alkyl aryl;

M=Alkali Metal, Alkaline Earth Metal, Ammonia, Amine, Substituted Amine such as monoethanol amine, diethanol amine, triethanol amine, morpholine, imidazole and the like;

a=0.01–0.8, preferably 0.01–0.6, and most preferably 0.01–0.5;

b=0.2–0.99, preferably 0.3–0.99, and most preferably 0.4–0.99;

c=0–0.5, preferably 0–0.3, and most preferably 0–0.1; and wherein a, b, c represent the mole fraction of each unit and the sum of a, b, and c, is 1.

Preferably, the "a" structure includes a styrene moiety.

The alkali metal in the dispersant of the present invention is preferably lithium, sodium, or potassium. The alkaline earth metal in the dispersant of the present invention is preferably magnesium or calcium.

Representative monomers for use in this invention for the "a" component include, but are not limited to, styrene, ethylene, propylene, or sulfonated styrene. Representative monomers for use in this invention for the "b" component include, but are not limited to, acrylic acid, methacrylic acid, alkyl esters of acrylic acid, alkyl esters of methacrylic acid, alkoxypolyoxyalkylene esters of acrylic acid, alkoxypolyoxyalkylene esters of methacrylic acid, maleic acid, vinyl sulfonic acid, methoxypolyoxyalkylene vinyl ether, methoxypolyoxyalkylene allyl ether, alkoxypolyoxyalkylene vinyl ether, or alkoxypolyoxyalkylene allyl ether.

Component "c" can be formed from a post reaction from the grafting of the side chains onto the polymer backbone such as a polyacrylate or maleic anhydride copolymer. The reaction to form component "c" is related to the temperature of the grafting reaction. If the temperature is high enough, the imide (succinimide) component "c" is formed. Component "c" is formed from a single monomer which is a component "b" with Y as COOH and Z as $CONHR_3$. A condensation reaction occurs wherein water condenses and the ring closes to form component "c".

The derivatized polycarboxylate dispersant of the present invention preferably includes a hydrophobic substituent functioning as a defoamer. The hydrophobic defoamer is present in an amount less than about 10% by weight of the derivatized polycarboxylate dispersant, and is preferably present in an amount less than about 5%. Besides being grafted or chemically linked onto the derivatized polycarboxylate dispersant by attaching via an ester linkage to a "b" group in the polymer structure above, the hydrophobic defoamer can be formulated into a mixture with the derivatized polycarboxylate dispersant. When grafted or chemically linked onto the defoamer is represented by the following formula (which is represented by "W" in the above polymer structure): $R_5$—$(CH_2CH_2O)_s$—$(CH_2C(CH_3)HO)_t$—$(CH_2CH_2O)_u$ where s, t, and u are integers from 0 to 200 with the proviso that t>(s+u) and where $R_5$ is a $C_1$ to $C_{18}$ alkyl or $C_6$ to $C_{18}$ alkyl aryl. The total of hydrophobic defoamer, which is either grafted or chemically linked onto the derivatized polycarboxylate dispersant or is formulated into a mixture with the derivatized polycarboxylate dispersant, is present in an amount less than about 10% by weight of the derivatized polycarboxylate dispersant.

The following defoamers are examples of hydrophobic defoamers that can be formulated into the polymer solution: polyoxyalkylene glycols, such as those sold under the trademark PLURONIC from BASF, acetylene glycols, and alkoxylated acetylene alcohols, such as those sold under the trademark SURFYNOL from Air Products, fatty acid alkoxylates, such as alkoxylated lauric or oleic acid, or alkoxylated fatty amines, such as an alkoxylated lauric or oleylamine formulated defoamers. These defoamers can be added alone or in combination.

We have found that the incorporation of amide or imide linkages between the copolymer, such as styrene-maleic main chain polymer, and the alkoxy polyoxyalkylene side chain can improve the chemical and performance stability of graft polymer solutions. Incorporation of nitrogen based linkages between main chain and side chain stabilizes side chain degrafting that slowly occurs with maleic mono ester linkages during solution storage. Improved solution stability leads to better long term performance behavior from aged polymer solutions. In applications where the polymer is used as a cement dispersant, the improvement produces better dispersability of cement from aged solutions and better maintenance of cement in a dispersed state.

It is not necessary that all linkages between the side chain and polymer backbone be through an amide or imide nitrogen. On the contrary, according to the present invention, it is preferred that the linkages be mixed between ester (or oxygen) and amide or imide. The combination of ester (or oxygen) and amide or imide linkages improves the long term performance, for example stability, of the polymer solution and lowers the cost relative to the all amide or imide pendant linkages.

EXAMPLES

The molecular weights herein are number average molecular weights.

Derivatized polycarboxylate dispersants of the present invention were prepared as a solution comprising neutralized polymer at about 40% solids and neutral pH. The sample O linked #1 contains methoxy polyoxyalkylene glycol with a MW of about 1100, Sample O linked #2 contains methoxy polyoxyalkylene glycol with a MW of about 1100, and Sample N linked contains methoxy polyoxyalkylene amine with a MW of about 1000. The solutions were tested as fresh and aged at room temperature for a given time. The solutions were added to a cement paste at a dose of 0.1% by weight of cement with a water/cement (W/C) ratio of 0.35. The resulting cement paste was tested for flow and spread.

TABLE 1

| Mix | Graft Polymer Dispersant | Fresh Dispersant Solution | | Aged Dispersant Solution | | Dispersant Solution Age Time (months) |
| --- | --- | --- | --- | --- | --- | --- |
| | | Flow (g/s) | Spread (cm) | Flow (g/s) | Spread (cm) | |
| 1 | O linked #1 | 49 | 12.5 | 22 | 8.6 | 22 |
| 2 | O linked #2 | 80 | 18.5 | 32 | 4.3 | 17 |
| 3 | N linked | 58 | 13.2 | 52 | 11.2 | 19 |

A Gel Permeability Chromatography (GPC) analysis of the fresh and aged dispersant from Table 1 was performed. The results in Table 2 show the percent ungrafted side chains present in the dispersant solution. Fewer nitrogen linked side chains de-grafted over the course of the test.

TABLE 2

| Mix | Graft Polymer Dispersant | Fresh Solution ungrafted side chain (% of total solids) | Aged Solution ungrafted side chain (% of total solids) | Dispersant Solution Age |
|---|---|---|---|---|
| 4 | O linked #1 | 21 | 42 | 22 |
| 5 | O linked #2 | 13 | 35 | 17 |
| 6 | N linked | 7 | 15 | 19 |

A dispersability comparison for dispersants with O linked side chain, a methoxy polyoxyalkylene glycol with a MW of 1100, a first preparation of a Mixed O/N linked side chain dispersant, a methoxy polyoxyalkylene glycol with a MW of 1100 and a methoxy polyoxyalkylene amine with a MW of 2000 and a molar ratio of O:N of about 2:1, and a second preparation of a Mixed O/N linked side chain dispersant, a methoxy polyoxyalkylene glycol with a MW of 1100 and a methoxy polyoxyalkylene amine with a MW of 2000 and a molar ratio of O:N of about 2:1, were compared to reference dispersants and tested in a cement paste formulation comprising Medusa Type 1 cement. In all mixes, the dispersant was added at 0.1% by weight of cement, and the water/cement ratio was 0.35. The final flow and final spread were tested about 20 minutes after the initial values were tested. Mixes 7, 8, and 9 were tested as freshly prepared, and Mixes 7a, 8a, and 9a were tested after being stored for six months. The results are listed in Table 3, and show similar performance when freshly prepared solutions were tested. After six months, the mixed linked dispersants showed improved flow and spread as compared to the O linked dispersant.

TABLE 3

| Mix | Dispersant | Yield (mPa) | Viscosity (mPas) | Initial Flow (g/s) | Final Flow (g/s) | Initial Spread (cm) | Final Spread (cm) |
|---|---|---|---|---|---|---|---|
| 7 | O linked | 3015 | 802 | 84 | 68 | 15.6 | 15.4 |
| 8 | Mixed linked #1 | 2384 | 614 | 101 | 80 | 17.1 | 16.6 |
| 9 | Mixed linked #2 | 2468 | 864 | 72 | 60 | 15.1 | 15.1 |
| 7a | O linked | 4795 | 1160 | 59 | 23 | 11.8 | 10.2 |
| 8a | Mixed linked #1 | 3409 | 1118 | 72 | 31 | 12.6 | 11.1 |
| 9a | Mixed linked #2 | 3902 | 1067 | 75 | 41 | 13.3 | 12.4 |

A dispersability comparison for dispersants with O linked and Mixed O/N linked side chains were tested in a concrete formulation comprising the dispersant, cement, coarse aggregate and fine aggregate. A plain concrete mixture was compared to a reference dispersant, a derivatized acrylic dispersant, an O linked (methoxy polyoxyalkylene glycol), a N linked (methoxy polyoxyalkylene amine), and a Mixed O/N linked (methoxy polyoxyalkylene glycol and methoxy polyoxyalkylene amine with a molar ratio of O:N of about 2:1). In the samples with the dispersant, the dispersant was added at 0.256% by weight of cement. Solutions of the test dispersants were aged for 2 weeks prior to being prepared in the concrete mixture. Mixes 10, 11, 12, 13, and 14 were tested as freshly prepared, and Mixes 10a, 11a, 12a, 13a, and 14a were tested after eight months of storage. The results of the comparison are listed in Table 4. The results show that after storage, the Mixed O/N dispersant shows improved performance over the O linked dispersant.

TABLE 4

| Mix | | Slump (inches) | Slump at 5/10/15 minutes (%) | Air at 5/10/15 minutes (%) | Water Reduction |
|---|---|---|---|---|---|
| 10 | Plain | 8.25/--/-- | | 0.9/--/-- | — |
| 11 | Ref. | 8.50/7.5/3.5 | | 2.2/3.3/3.6 | 33 |
| 12 | O linked | 6.5/1.75/1.5 | | 3.0/2.4/2.4 | 30 |
| 13 | Mixed O/N | 8.5/8.25/1.75 | | 1.4/1.4/1.7 | 31 |
| 14 | N linked | 7.75/3.0/1.5 | | 1.5/1.9/2.5 | 33 |
| 10a | Plain | 8.0/--/-- | | 1.2/--/-- | — |
| 11a | Ref. | 9.0/7.75/6.25 | | 1.8/3.3/4.3 | 32 |
| 12a | O linked | 8.0/4.5/3.25 | | 3.8/3.0/3.3 | 24 |
| 13a | Mixed O/N | 8.75/5.0/4.25 | | 1.4/2.3/3.9 | 30 |
| 14a | N linked | 8.25/3.75/2.5 | | 1.7/2.5/3.3 | 31 |

The polymers used in the derivatized polycarboxylate dispersant of the present invention can be made by methods known in the art, such as those referenced in U.S. Pat. Nos. 5,661,206; 5,393,343; 5,158,996; 5,047,087; 4,972,025; 4,968,734; 4,463,406; and 4,471,100 all of which are hereby incorporated by reference herein as if fully written out below.

Specific nonlimiting examples of synthesizing the derivatized polycarboxylate dispersants of the present invention are described below.

Synthesis Example Number 1

Sixteen grams of styrene maleic anhydride (SMA), SMA-1000 from Atochem with a 2500 MW, was dissolved in 53.1 g of tetrahydrofuran (THF). Next, 39.6 g of methoxy polyoxyalkylene amine, XTJ-506 from Huntsman Corporation with a 1000 MW, and 4.8 g of triethyl amine were dissolved in 60.6 g of THF. The amine solution was drip fed into the stirring SMA solution over a period of about 30 minutes. The mixture was stirred for about 45 minutes at room temperature then heated to about 45° C. The mixture was reacted for about 2 hours. The THF solvent was removed from the mixture and the mixture was dried to a constant weight leaving polymer. The polymer was dissolved in an aqueous caustic solution and the resulting solution was adjusted to about 40% solids and a pH of about 7.0.

Synthesis Example Number 2

One hundred grams of styrene maleic anhydride (SMA), SMA-1000 from Atochem with a 2500 MW, was dissolved in 310 g of tetrahydrofuran (THF). Next, 321 g of methoxy polyoxyalkylene amine, XTJ-508 from Huntsman Corporation, was delivered to the stirring SMA solution over a period of about 45 to about 60 minutes under nitrogen pressure. The mixture was heated to about 45° C. and reacted for about 1 hour. The THF solvent was removed from the mixture and the mixture was dried to a constant weight leaving polymer. The polymer was dissolved in an aqueous caustic solution and the resulting solution was adjusted to about 40% solids and a pH of about 7.0.

Synthesis Example Number 3

One hundred twenty-eight grams of styrene maleic anhydride (SMA), SMA-1000 from Atochem with a 2500 MW, was dissolved in 128 g of methyl isobutyl ketone (MIBK) under nitrogen pressure and stirring at 100° C. An addition of a mixture comprising 53 g of methoxy polyoxyethylene glycol (mPEG-OH) with a 1100 MW and 1 g of dimethylaminopyridine (DMAP) was added to the stirring SMA solution. This addition was followed by 50.25 g of methoxy polyoxyalkylene amine, XTJ-508 from Huntsman Corporation with a 2000 MW, to the SMA solution. Three more identical additions of mPEG-OH/DMAP followed by methoxy polyoxyalkylene amine were added to the stirring SMA solution. The resulting mixture was reacted for about 4.5 hours. The MIBK solvent was removed from the mixture and the mixture was dried to a constant weight leaving polymer. The polymer was dissolved in an aqueous caustic solution and the resulting solution was adjusted to about 40% solids and a pH of about 7.0.

Synthesis Example Number 4

Six and four tenths grams of styrene maleic anhydride (SMA), SMA-1000 from Atochem with a 2500 MW, was dissolved in 9.4 g of methyl isobutyl ketone (MIBK) under nitrogen atmosphere and stirring at 100° C. Next, 15.9 g of methoxy polyethylene glycol (mPEG-OH) with a 1100 MW and 0.2 g of dimethylaminopyridine (DMAP) were added to the stirring SMA solution. The resulting mixture was reacted for about 4.5 hours. The MIBK solvent was removed from the mixture and the mixture was dried to a constant weight leaving polymer. The polymer was dissolved in an aqueous caustic solution and the resulting solution was adjusted to about 40% solids and a pH of about 7.0.

The inventive derivatized polycarboxylate dispersant is capable of providing a Type A to Type F water-reducing effect, as defined in ASTM C494, Standard Specification for Chemical Admixtures for Concrete.

The derivatized polycarboxylate dispersants of the invention are added to mixtures of cementitious materials in amounts from about 0.01 to about 3%, preferably about 0.05 to about 1% by weight based on the weight of the cement. For example, the dispersant is preferably added prior to, during, or after initial mixing, to a cementitious composition mixture of a hydraulic cement, water, and aggregate, in which a reduced amount of water can be used compared to mixtures not containing the dispersant. The proportion of cement, water, and aggregate (if any) used in the cementitious composition mixture depends upon the end use desired, and is within the knowledge of the skilled artisan for a selected use.

Additionally, the derivatized polycarboxylate dispersant of the present invention is formulated into a compatibilizing admixture for cementitious mixtures containing hydraulic portland cement and greater than about 10 percent pozzolanic cement replacement by weight of the portland cement and cement replacement.

In one embodiment, the present invention is an additive formulation, or an admixture, for incorporation in hydraulic cement mixtures, such as concretes, mortars and grouts, containing portland cement and pozzolanic cement replacement. By "portland cement" is meant all cementitious compositions which have a high content of tricalcium silicate, and thus are portland cement or are chemically similar or analogous to portland type cement, the specification for which is set forth in ASTM specification C-150-80.

Pozzolanic replacement materials for hydraulic, or portland-type, cement which can be used in high proportion according to the present invention include silica fume, fly ash, both Class C and Class F, blast furnace slag, and natural pozzolan materials. These replacement materials can be used in a proportion, based on the weight of the hydraulic cement and the cement replacement, of greater than 10 weight percent, preferably greater than 15 weight percent, and most preferably greater than 20 weight percent. It is most preferred, however, that the cementitious mix contain at least 50 weight percent portland cement, based upon the total weight of portland cement and pozzolanic replacement material, combined.

As discussed above, the addition of high proportions of the pozzolanic material to the cementitious mixture in combination with a conventional water reducing admixture (which water reducer increases compressive strength), results in a significant retarding of the setting time for the cementitious mixture.

The present invention provides a novel compatibilizing admixture for the high pozzolanic replacement material containing hydraulic cement, as well as a novel cementitious mixture containing the pozzolanic replacement and the compatabilizing admixture, and a method for preparing the cementitious material. The present invention significantly reduces, and in many instances eliminates the retardation of concrete containing high proportions of pozzolanic replacement materials for the hydraulic, or portland type, cement.

This embodiment of the present invention includes a cementitious mixture comprising a hydraulic cement; greater than about 10% by weight of a pozzolanic cement replacement selected from fly ash, slag, natural pozzolans, and mixtures thereof based on the total of said hydraulic cement and cement replacement; and a compatabilizing admixture, wherein the compatibilizing admixture comprises the derivatized polycarboxylate dispersant, described above, in combination with an accelerator for concrete.

While the use of the derivatized polycarboxylate polymer dispersants with conventional accelerators, including calcium chloride, bromide or other halide, is effective to overcome the set time retarding effects of the high pozzolan content cementitious mixture, the present invention is particularly effective in avoiding the use of chloride, bromide or other halide containing accelerators, and thus avoids corrosion problems often associated with them.

Preferably, the accelerator according to the present invention comprises at least one of a) a nitrate salt of an alkali metal, alkaline earth metal, or aluminum;

b) a nitrite salt of an alkali metal, alkaline earth metal, or aluminum;

c) a thiocyanate of an alkali metal, alkaline earth metal, or aluminum;

d) an alkanolamine;

e) a thiosulfate of an alkali metal, alkaline earth metal, or aluminum;

f) a hydroxide of an alkali metal, alkaline earth metal, or aluminum;

g) a carboxylic acid salt of an alkali metal, alkaline earth metal, or aluminum; or, h) a polyhydroxylalkylamine.

The salts of nitric acid have the general formula $M(NO_3)_a$ where M is an alkali metal, or an alkaline earth metal or aluminum, and where a is 1 for alkali metal salts, 2 for alkaline earth salts, and 3 for aluminum salts. Preferred are nitric acid salts of Na, K, Mg, Ca and Al.

Nitrite salts have the general formula $M(NO_2)_a$ where M is an alkali metal, or an alkaline earth metal or aluminum, and where a is 1 for alkali metal salts, 2 for alkaline earth salts, and 3 for aluminum salts. Preferred are nitric acid salts of Na, K, Mg, Ca and Al.

The salts of the thiocyanic acid have the general formula $M(SCN)_b$, where M is an alkali metal, or an alkaline earth metal or aluminum, and where b is 1 for alkali metal salts, 2 for alkaline earth salts and 3 for aluminum salts. These salts are variously known as sulfocyanates, sulfocyanides, rhodanates or rhodanide salts. Preferred are thiocyanic acid salts of Na, K, Mg, Ca and Al.

Alkanolamine is a generic term for a group of compounds in which trivalent nitrogen is attached directly to a carbon atom of an alkyl alcohol. A representative formula is $N[H]_c[(CH_2)_dCH_2OH]_e$, where c is 3-e, d is 1 to about 5 and e is 1 to about 3. Examples include, but are not limited to, are monoethanolamine, diethanolamine and triethanolamine.

The thiosulfate salts have the general formula $M_f(S_2O_3)_g$ where M is alkali metal or an alkaline earth metal or aluminum, and f is 1 or 2 and g is 1, 2 or 3, depending on the valencies of the M metal elements. Preferred are thiosulfate acid salts of Na, K, Mg, Ca and Al.

The carboxylic acid salts have the general formula RCOOM wherein R is H or $C_1$ to about $C_{10}$ alkyl, and M is alkali metal or an alkaline earth metal or aluminum. Preferred are carboxylic acid salts of Na, K, Mg, Ca and Al. A preferred carboxylic acid salt is calcium formate.

A preferred polyhydroxylalkylamine has the general formula

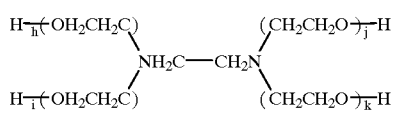

wherein h is 1 to 3, i is 1 to 3, j is 1 to 3, and k is 0 to 3.
Preferred is tetrahydroxyethylethylenediamine.

A conventional chloride-containing accelerator may be used in combination with the polycarboxylate dispersant to form a compatibilizing admixture according to the present invention, for product applications in which corrosion of reinforcing steel is not an issue, for example, in concrete block production.

The cementitious mixture additionally may contain water in an amount sufficient to effect hydraulic setting of the cement and aggregate mixture, and if desired, an additional material such as silica fume or metakaolin. The term aggregate includes both fine aggregate such as sand and coarse aggregate such as gravel as is common in the art. The proportion of fine and coarse aggregate will vary depending on the desired properties of the mortar or concrete. The amount of water generally should be enough to effect hydraulic setting of the cement component and to provide a desired degree of workability to the mix before hardening.

In the practice of the present invention, the compatabilizing admixture components described above are incorporated into hydraulic cement mixes in amounts sufficient to compatibilize the pozzolanic replacement material and the hydraulic cement, to accelerate the rate of hardening and setting of the mixes and to reduce water to increase compressive strength after hardening, thereby enhancing overall durability of the product. The admixture is preferably incorporated into the mix as an aqueous solution comprising portion of the water used in mixing the hydraulic cement, pozzolanic replacement material, aggregate, and any additional additives. Representative admixture formulations are set forth in Table 5A, below. (Percentages are by weight.)

TABLE 5A

| Component | Percentage | Preferred |
|---|---|---|
| Nitrate salt | 0–60 | 20–40 |
| Nitrite salt | 0–60 | 20–40 |
| Thiocyanate | 0–10 | 1–4 |
| Alkanolamine | 0–10 | 0–1 |
| Polyhydroxylalkylamine | 0–5 | 0–4 |
| Dispersant | 1–20 | 3–8 |
| Thiosulfate | 0–10 | |
| Carboxylic acid salt | 0–20 | |
| Hydroxide | 0–10 | |

The remainder of the admixture solution comprises water. By way of example, but not of limitation, the amount of active admixture material delivered per 100 pounds of cementitious material (cement+cement replacement) in aqueous solution is preferably calculated as follows in Table 5B.

TABLE 5B

| Admixture Solution | | Active Components (pounds) |
|---|---|---|
| (Fl. oz.) | (ml/100 kg) | (% by wt. cementitious material) |
| 2.5 | 160 | 0.09 |
| 5 | 320 | 0.18 |
| 10 | 650 | 0.36 |
| 20 | 1300 | 0.72 |
| 30 | 1960 | 1.08 |
| 40 | 2600 | 1.44 |
| 50 | 3260 | 1.80 |

Additionally, the derivatized polycarboxylate dispersant of the present invention is directed to cementitious dry cast mixtures for forming cementitious articles. The cementitious dry cast mixture comprises cement, water, coarse aggregate, fine aggregate, and the derivatized polycarboxylate dispersant of the present invention.

While polycarboxylate dispersants in general are known in the industry to be highly effective and efficient at producing highly flowable concrete, the derivatized polycarboxylate dispersants of the present invention may be advantageously used at low to extremely low levels, 0.005 to 0.120% by weight of cement, to improve the paste phase response to vibration or other energy applied to the cementitious dry cast mixture during consolidation. Consolidation and compaction of the dry cast mixture results in increased compressive strengths, higher density, lower water absorption or permeability, and better surface appearance of the finished unit (reduced imperfections and holes). Additionally, the reduced levels of dispersants result in a reduced cost for materials for the cementitious dry cast mixture.

Cementitious dry cast mixtures of the present invention generally comprise hydraulic cement, the dispersant, fine aggregate, coarse aggregate, and optionally silica fume, pozzolans such as fly ash, and pigments. Water is added to form the cementitious mixture into a paste.

The hydraulic cement can be a portland cement, high alumina cement, or any other suitable hydraulic binder. The coarse aggregate can be silica, quartz, crushed round marble, glass spheres, granite, limestone, calcite, feldspar, alluvial sands, any other durable aggregate, and mixtures thereof. The fine aggregate can be sand, any other suitable aggregate, and mixtures thereof.

Cementitious dry cast mixtures have been found to respond to vibration or applied energy when the mixture is properly proportioned. The derivatized polycarboxylate dispersants improve the mobility of the paste when under stress from vibration or energy. When the mold is subjected to vibration or other energy, the paste fraction of the mixture functions as the vehicle/lubricant by which the solid aggregate particles move and orient themselves during consolidation.

The derivatized polycarboxylate dispersants of the present invention allow for reduced water content, minimize the effect of the variation in size of the aggregate particles, and allow the incorporation of additional fines such as fumed silica in the mixture. All of these factors in turn improve the green strength of the articles formed from cementitious dry cast mixtures.

The reduced water content provides cementitious dry cast mixtures with stiff to extremely dry consistencies, with typical W/C ratios at or below 0.36, preferably at or below 0.30. Without being limited by theory, it is theorized that the reduced water content allows the cementitious dry cast mixture to set faster which increases the green strength of an article formed from the cementitious dry cast mixture. This is also thought to result in reduced slump, sagging and deformation when the article is removed from a mold or is extruded from a die. Additionally, the cementitious dry cast mixtures of the present invention have the appearance of dry to almost dry.

The derivatized polycarboxylate dispersants of the present invention minimize the effect of the variation in size of the aggregate particles by improving the lubricity of the thin paste layer covering the aggregate allowing improved movement during consolidation. This effect is typically obtained by increasing the cement content, the water content, or both. Minimizing water content and maximizing cement efficiency in turn increases the green strength of an article formed from the cementitious dry cast mixture.

Addition of silica fume increases the cohesiveness of the cementitious dry cast mixture which then increases the green strength of an article formed from the cementitious dry cast mixture. Silica fume used in the present invention can be uncompacted or can be partially compacted. Silica fume additionally reacts with the hydration byproducts of the cement binder which provides for increased strength of the finished articles and decreases the permeability of the finished articles. The silica fume, or other pozzolans such as fly ash, can be added to the cementitious dry cast mixture in an amount from about 5% to about 30% based on the weight of cement.

By allowing for a reduced W/C ratio, improved paste lubricity and increased green strength, the cycle time of producing an individual article from a cementitious dry cast mixture is reduced. Compared to dry cast mixtures of the prior art, cycle time reductions are improved by 50 to 100%. By allowing articles to be removed from the molds in a shorter period of time or by increasing the rate of extrusion, the cycle time for producing each article is reduced. Additionally, more articles can now be produced in the same equipment. These factors combine to reduce the cost of manufacture of each article, such as masonry blocks.

Additionally, the additive dosage of the derivatized polycarboxylate dispersant of the present invention can be slightly increased (but still in the range of 0.005 to 0.120% by cement weight) in combination with a reduction of the W/C ratio to provide further improvements without changing the dry consistency of the mixture. As the dispersant level is increased, the W/C ratio can be decreased. The W/C ratio and dispersant level can be varied to optimize the production of each type of dry cast article from a cementitious dry cast mixture.

For masonry block, the compacted density and compressive strength of dry cast concrete mixtures have been shown to be increased over a plain reference at the same W/C ratio by using a derivatized polycarboxylate additive at about 0.01 to about 0.03% by weight of cement. The compaction speed, consolidation and resulting compressive strength of masonry block has been shown to be improved by using a derivatized polycarboxylate additive, most preferably at about 0.03% by weight of cement. The compressive strength of a dry cast mixture of the present invention is increased by up to 30%. The basic desired characteristics of the dry cast mixture for masonry block, which are sharp corners, sharp edges, no web cracking, controlled swipe, no sagging or deformation, are not negatively affected by these improvements.

For pipe and roof tile, the increased density and compaction of the cementitious dry cast mixture additionally results in reduced imperfections in an article produced from the cementitious dry cast mixture. Typically, a cementitious dry cast mixture has air pockets that are retained in the mixture after the mixture has set. On the surface of an article, these holes are called bugholes and they detract from the aesthetic value of the article. Other imperfections referred to as honeycombs, which are zones of poorly compacted mixture, decrease the compressive strength of the article and increase the permeability of the article. The increased density and compaction, according to the invention, reduce or eliminate these problems. Additionally, other surface defects are eliminated by the vibratory consolidation of the cementitious dry cast mixtures of the present invention.

The derivatized polycarboxylate additive can be combined with other chemical or mineral additives typically used in the various applications such as set accelerators, set retarders, defoaming agents, air-entraining or air detraining agents, water repellant agents, water reducing agents, and any other conventional additives for cementitious mixtures. The basic properties of a cementitious dry cast mixture are not negatively affected by the use of the derivatized polycarboxylate dispersants of the present invention.

The inventive derivatized polycarboxylate dispersant may be added to many different types of cementitious mixtures, and is not limited to the mixtures described above. Cementitious mixes in which the inventive derivatized polycarboxylate dispersant can be used as additives are paste slurries, mortars and concretes. The hydraulic binder used in the cementitious composition may be portland cement, alumina cement, or blended cement, for example pozzolanic cement, slag cement, or other types, portland cement being the preferred. Conventional admixtures in cement technology, such as set accelerators or retarders, frost protection agents, pigments, and the like, may also be present in the cementitious mixes of the invention.

As demonstrated above, the present invention achieves the objects of the invention. The present invention therefore provides a dispersant with increased storage life.

Also, the present invention provides a hydraulic cement or concrete dispersant material that is several times more efficient than the traditional dispersants such as BNS and SMF. The present invention further provides a cement or concrete dispersant material with improved efficiency which reduces the amount of material required to achieve a desired level of concrete workability or water reduction.

In addition, the present invention provides a cement or concrete dispersant material to improve concrete slump retention while maintaining normal setting characteristics. The present invention further provides a cement or concrete dispersant material capable of providing a Type A to Type F water-reducing effect.

Additionally, a cementitious mixture is provided which contains a significant proportion of pozzolan cement replacement materials for hydraulic cement, such as portland cement, as well as water reducing materials, which have acceptable or improved compressive strength, and which set in an industry-acceptable time period. A method is provided for preparing a cementitious material which contains a significant proportion of pozzolan cement replacement materials for hydraulic cement, such as portland cement, as well as water reducing materials, which have acceptable or improved compressive strength and which set in an industry-acceptable time period. The objects are achieved through the inventive compatibilizing admixture for cementitious mixtures which contain a significant proportion of pozzolan cement replacement.

Also, the compatibilizing admixture acts as a mid-range water reducer (permitting a reduction of mix water of from about 5% to about 15%. Compressive strength and durability of the resulting product are improved. Significant replacement of hydraulic cement by pozzolanic materials is achieved, with setting times for the cementitious mixture containing the replacement, such as both Class C and Class F fly ash, equivalent to or less than set times for conventional mixtures without the replacement materials. Set times of the inventive cementitious mixtures are significantly accelerated over untreated concrete containing high amounts of fly ash, blast furnace slag or pozzolanic cement.

Additionally, the present invention provides a derivatized polycarboxylate dispersant for a cementitious dry cast mixtures to allow for reduced water usage, consolidation and compaction of the dry cast mixture, providing for increased compressive strength and reduced cycle time of dry cast formation.

It should be appreciated that the present invention is not limited to the specific embodiments described above, but includes variations, modifications and equivalent embodiments defined by the following claims.

What is claimed is:

1. A derivatized polycarboxylate dispersant which is a derivatized polymer comprising a backbone having moieties derived from (a) an unsaturated hydrocarbon; (b) at least one of a substituted carboxylic acid monomer, a substituted ethylenically unsaturated monomer, and maleic anhydride, and (c) optionally including an N-polyoxyalkylene succinimide; and wherein derivative moieties are pendant to the backbone monomer by at least one ester linkage and at least one amide linkage.

2. The derivatized polycarboxylate dispersant of claim 1, wherein the derivatized polymer is a random copolymer of general structural units shown below:

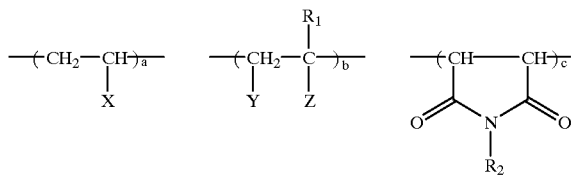

wherein:
the "b" structure is one of a substituted carboxylic acid monomer, a substituted ethylenically unsaturated monomer, and maleic anhydride wherein an acid anhydride group (—CO—O—CO—) is formed in place of the groups Y and Z between the carbon atoms to which the groups Y and Z are bonded respectively, and the "b" structure must include at least one moiety with a pendant ester linkage and at least one moiety with a pendant amide linkage;

X=H, $CH_3$, $C_2$ to $C_6$ Alkyl, Phenyl, or Substituted Phenyl;

Y=H, —COOM, —COOH, or W;

W=a hydrophobic defoamer represented by the formula $R_5$—$(CH_2CH_2O)_s$—$(CH_2C(CH_3)HO)_t$—$(CH_2CH_2O)_u$ where s, t, and u are integers from 0 to 200 with the proviso that t>(s+u) and wherein the total amount of hydrophobic defoamer is present in an amount less than about 10% by weight of the derivatized polycarboxylate dispersant;

Z=H, —COOM, —$OR_3$, —$COOR_3$, —$CH_2OR_3$, or —$CONHR_3$;

$R_1$=H, or $CH_3$;

$R_2$, $R_3$, are each independently a random copolymer of oxyethylene units and oxypropylene units of the general formula —$(CH_2C(R_1)HO)_m R_4$ where m=10 to 500 and wherein the amount of oxyethylene in the random copolymer is from about 60% to 100% and the amount of oxypropylene in the random copolymer is from 0% to about 40%;

$R_4$=H, Methyl, or $C_2$ to $C_8$ Alkyl;

$R_5$=$C_1$ to $C_{18}$ alkyl or $C_6$ to $C_{18}$ alkyl aryl;

M=Alkali Metal, Alkaline Earth Metal, Ammonia, Amine, or Substituted Amine;

a=0.01–0.8;

b=0.2–0.99;

c=0–0.5; and wherein a, b, c represent the mole fraction of each unit and the sum of a, b, and c, is 1.

3. The derivatized polycarboxylate dispersant of claim 2, wherein a is from 0.01 to 0.6.

4. The derivatized polycarboxylate dispersant of claim 3, wherein a is from 0.01 to 0.5.

5. The derivatized polycarboxylate dispersant of claim 2, wherein b is from 0.3 to 0.99.

6. The derivatized polycarboxylate dispersant of claim 5, wherein b is from 0.4 to 0.99.

7. The derivatized polycarboxylate dispersant of claim 2, wherein c is from 0 to 0.3.

8. The derivatized polycarboxylate dispersant of claim 7, wherein c is from 0 to 0.1.

9. The derivatized polycarboxylate dispersant of claim 2, wherein the "a" structure includes at least one of a styrene moiety and a sulfonated styrene.

10. The derivatized polycarboxylate dispersant of claim 2, wherein X is selected from the group consisting of p-Methyl Phenyl, p-Ethyl Phenyl, Carboxylated Phenyl and Sulfonated Phenyl.

11. The derivatized polycarboxylate dispersant of claim 2, wherein M is selected from the group consisting of monoethanol amine, diethanol amine, triethanol amine, morpholine and imidazole.

12. The derivatized polycarboxylate dispersant of claim 1 capable of providing a Type A to Type F water-reducing effect as defined in ASTM C494.

* * * * *